Dec. 11, 1928.
H. KUCKUCK
1,695,017
PRECISION BORE AND METHOD OF PRODUCING SAME
Filed Nov. 26, 1927
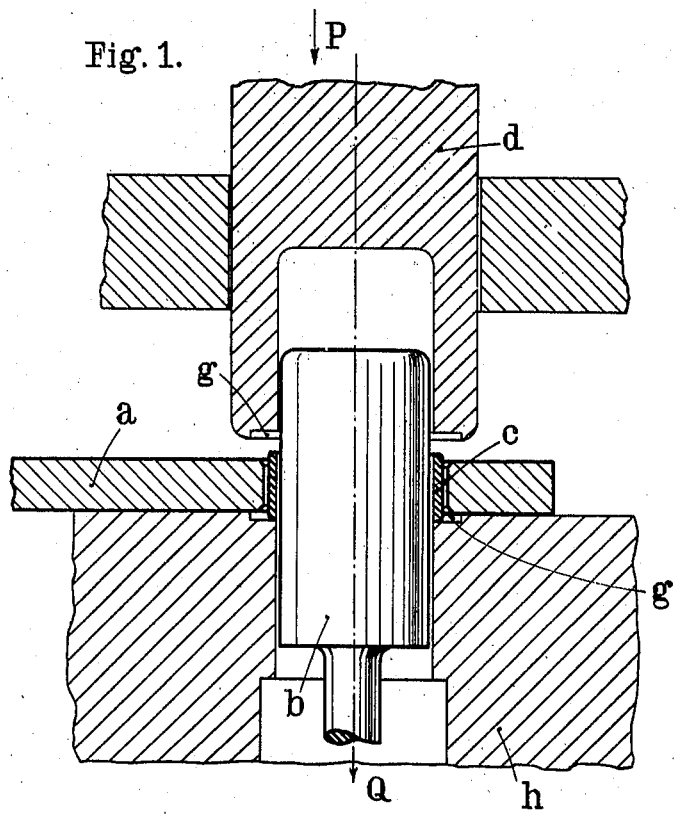
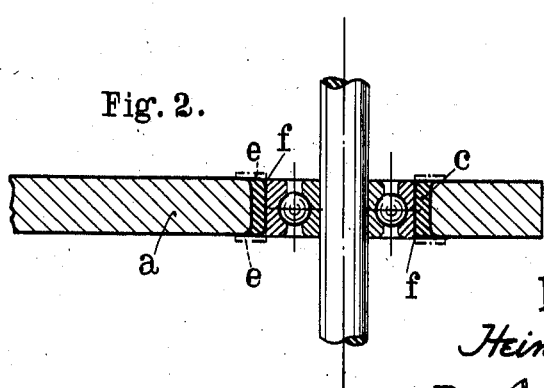
Inventor
Heinrich Kuckuck
By Dowell & Dowell
Attorneys

Patented Dec. 11, 1928.

1,695,017

UNITED STATES PATENT OFFICE.

HEINRICH KUCKUCK, OF BREMEN, GERMANY.

PRECISION BORE AND METHOD OF PRODUCING SAME.

Application filed November 26, 1927, Serial No. 235,999, and in Germany May 6, 1926.

The invention relates to precision or tolerance bores and a method of making such bores which are to be a perforation or a recess in an object of metal. Said bores are particularly adapted to form the seat of bearings and to receive the rings of small ball or roller bearings used in joints of mechanical apparatus, such as prostheses or the like.

The object of the invention is to devise bores for bearings or the like, which bores are of high accuracy in diameter, circular form and smoothness and are suitable to receive delicate parts of a structure.

This object is attained by the provision of a lining made of a material capable of being formed by pressing, and by giving the inner face of the said lining the required width and precision with the employment of a gauge mandrel, while at the same time joining the periphery of the lining to the part designed to receive the same, the operation being performed by upsetting or deforming the annular lining.

According to the invention, the housing or other part to be provided with the precise bore is first formed with a preliminary bore, the diameter of which is somewhat greater than the external diameter of the outer ring or rings of the roller or ball bearing or bearings to be inserted into the precise bore, or of the shaft to be received by the precise or tolerance bore. The width of the bore made in the housing or casing must be sufficiently greater than the external diameter of the part to be inserted into the precise bore as to enable an intermediate metal ring to be inserted into the said preliminary bore. The material of which this intermediate ring is made must have a lower elastic limit than the material of which the housing is made. Preferably, the ring consists of a soft metal or alloy which is malleable or deformable by pressure. In order to produce the final exact bore, a gauge mandrel is now inserted into the intermediate ring, the periphery of said gauge being ground or finished to correspond exactly to the diameter and shape of the precise bore to be produced. This gauge mandrel takes the place of the part to be finally received by the precise bore, for instance, a ball bearing or a roller bearing or a shaft. The intermediate metal ring is now firmly fixed to the housing by a pressing operation or by a combined upsetting and deforming operation, by which the material of the intermediate ring is firmly pressed into the irregularities of the inner wall of the housing and is thus caused to adhere to the housing, while it is at the same time accommodated to the periphery of the mandrel. The gauge mandrel is then withdrawn from the intermediate ring, and the bore thus produced in the intermediate ring will show an extremely smooth mirror-like polished surface, the diameter of the bore having the required exact size within extremely narrow limits of error or tolerance. This precise bore may therefore be used directly for the reception of a ball bearing or a roller bearing or a shaft. It will thus be seen that the required exact bore can, in each case, be obtained by the employment of suitably prepared gauge mandrels. It will be understood that in order to properly carry out the improved method, it is important that the specific pressure exerted by the body mounted within the bore of the intermediate ring should be less than the elastic limit of the material employed for the intermediate ring, in order to avoid rapid wear of the bearing and oscillation of the shaft or part mounted therein.

It may also be pointed out that if an intermediate metal ring were pressed directly around the outer ring of a small ball bearing placed into the preliminary bore, there would be the danger of the outer ring of the ball bearing becoming subjected to unduly high stresses during the pressing operation, and this might lead to a deformation of the outer ball bearing ring and consequently to a jamming of the balls within the ball bearing. Any risk of this kind is entirely avoided by the invention, as the ball bearings may be quite safely inserted into the precise bore thus made beforehand.

The invention is particularly advantageous in all cases in which the bearing or housing provided with the precise bore is to be electro-plated, for instance, nickel plated, after the production of the precise bore. In such cases the intermediate metal ring should be made of a material which will not form a firm connection or combination with electro-deposit, so that the precise bore produced will not be deranged or altered by the subsequent operation or electro-deposition. Such a suitable material may be, for instance, duraluminium which during a nickel-plating operation will not combine with the nickel, but owing to the presence of a galvanic reactive component (steel), will receive merely a coating of nickel which may be subsequently very easily removed without the employment of sharp tools. The employment of such a material for the intermediate ring is essential for instance in the case of joints used in the making of prostheses links.

In the accompanying drawing, which forms a part of this specification,

Fig. 1 diagrammatically illustrates the operative parts of an apparatus adapted to carry the method into practice, some of said parts being shown in vertical section, and Fig. 2 shows in cross section, a bearing device seated in a bore finished according to the invention.

Referring to the drawings, $a$ indicates a housing or casing having a bore which is bevelled at the edges. Into the bore of the housing $a$ is inserted a ring-shaped strip $c$ of metal, which ring has lateral play in the bore of the housing $a$, and also an internal gauge mandrel $b$ inserted into the intermediate ring $c$. The gauge mandrel $b$ is adapted to be moved up and down in the direction Q for the purpose of preventing the ring and mandrel from binding or freezing together. $d$ indicates a die which is movable up and down independently of the mandrel $b$. The height or width of the ring $c$ is greater than the axial width of the bore in the housing $a$. Upon the die or ram $d$ being pressed with a force P against the ring $c$ which is supported by a table $h$, the ring $c$ is compressed and flattened so that it forms a very intimate and uniform connection with the internal surface of the bore of the housing $a$, and is also at the same time pressed against the cylindric surface of the gauge mandrel $b$. Annular grooves $g$ or depressions formed in the opposite end faces of the ram $d$ and the table $h$ facilitate the outward spreading or flow of the material of the ring $c$ against the widened ends or beveled edges of the bore in the housing $a$. By thereafter withdrawing the gauge mandrel from the intermediate ring $c$ in the direction of the arrow Q, the required precise bore is completed. In the drawing only the working elements of a press are shown, while the pertinent parts adapted to operate the said elements may be constructed as well known in the art.

Fig. 2 shows the intermediate ring $c$ after the completion of the pressing operation. It also shows a ball bearing inserted into said ring. It is advisable to remove the edges or burr $e$ of the ring $c$ projecting on both sides of the housing $a$, for instance by means of a milling cutter, and it is also advisable to round off the precise bore at the edges $f$, as shown.

The invention is particularly applicable to cases in which finishing bores by grinding or otherwise are difficult to make, or very expensive, or inadvisable in view of further treatment, for instance, electro-plating. By dispensing with the necessity of a special finishing operation, the method hereinbefore described, apart from saving of costs, results in a product of high accuracy.

The invention is suitable for bearings in which the specific load that is, the load per unit of area, is rather small, as especially in the case of fairly small ball or roller bearings.

In the foregoing specification and accompanying drawing I have disclosed, by way of example, the principle of my invention and the manner in which it may be performed, but I do not wish to be limited to the aforesaid details, but what I claim is—

1. A method of making precision or tolerance bores or seats of a determined size in a plate or housing, characterized by making an oversized bore in the plate or housing, placing an intermediate or lining ring within said bore, inserting a gauge mandrel through said ring and axially compressing the ring to the face of the bore while forming and sizing the ring by said mandrel.

2. A method of making precision or tolerance bores or seats of a determined size in a plate or housing member, characterized by axially compressing lining rings within oversized bores performed in the walls of the plate or housing member so as to bind the same to the bore surfaces, while simultaneously forming the rings to proper size by a gauge mandrel.

3. A method of making precision or tolerance bores or seats of a determined size in a supporting member, characterized by preforming oversized bores therein, placing lining rings of soft metal within said oversized bores, forming the rings to precise size by a gauge mandrel inserted therethrough and simultaneously compressing said rings axially around the mandrel so as to bind the same to the inner walls or surfaces of the bores.

4. A method of making precision or tolerance bores characterized by inserting a lining ring within an oversized bore in a member, placing a gauge mandrel within the ring and imparting reciprocal movement to the mandrel while simultaneously applying axial compression to the ring, thereby causing the latter to expand so as to fix itself firmly within said bore and to attain a perfect internal diameter or bearing surface before the mandrel is removed and the compression released.

5. A method of making precision or tolerance bores or seats of a predetermined size, characterized by inserting a lining ring within a preformed oversized bore or seat around a gauge mandrel and axially compressing the ring while simultaneously reciprocating the mandrel therewithin, whereby the ring under such compression is formed as a fixed element within the bore with its inner periphery or bearing surface calibrated according to the size of the mandrel.

6. A method of making precision or tolerance bores or seats of a predetermined size in a housing or supporting member, characterized by inserting a lining ring within a preformed oversized bore or seat around a gauge mandrel and axially compressing the ring while simultaneously reciprocating the mandrel therewithin, whereby the ring under such compression is formed as a fixed element within the bore with its inner periphery or bearing surface calibrated according to the size of the mandrel, said ring being of a metal alloy which does not electroplate so easily as the material of the housing or supporting member.

7. A tolerance bore or seat in a housing or supporting member, comprising a lining ring compressed within a bore in the housing as a fixed part of the latter with its inner bearing surface calibrated to desired size, said ring being of a metal alloy such as duraluminium which does not electroplate so easily as the material of the housing or supporting member in which it is seated.

In testimony whereof I have signed my name to this specification.

HEINRICH KUCKUCK.